United States Patent
Narita et al.

(10) Patent No.: US 7,567,303 B2
(45) Date of Patent: Jul. 28, 2009

(54) TELEVISION BROADCAST RECEIVER

(75) Inventors: Shusuke Narita, Daito (JP); Toshihiro Takagi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 711 days.

(21) Appl. No.: 11/288,198

(22) Filed: Nov. 29, 2005

(65) Prior Publication Data

US 2006/0117353 A1   Jun. 1, 2006

(30) Foreign Application Priority Data

Nov. 29, 2004   (JP) .............................. 2004-343410

(51) Int. Cl.
H04N 5/45   (2006.01)

(52) U.S. Cl. .................................... 348/725

(58) Field of Classification Search ................. 348/725, 348/731, 732
See application file for complete search history.

(56) References Cited

U.S. PATENT DOCUMENTS

| | | | | |
|---|---|---|---|---|
| 5,430,769 A * | 7/1995 | Patsiokas et al. | ............ | 375/347 |
| 6,774,863 B2 * | 8/2004 | Shirosaka et al. | ........... | 343/797 |
| 6,937,188 B1 * | 8/2005 | Saunders et al. | ............ | 342/359 |
| 7,286,190 B2 * | 10/2007 | Klopfenstein et al. | ....... | 348/569 |
| 2003/0228837 A1 * | 12/2003 | Reutter et al. | .................. | 452/37 |
| 2004/0183947 A1 * | 9/2004 | Lee | ............................. | 348/570 |
| 2005/0089123 A1 * | 4/2005 | Spiegel | ....................... | 375/345 |
| 2005/0253973 A1 * | 11/2005 | Adachi et al. | ............... | 348/838 |
| 2007/0230403 A1 * | 10/2007 | Douglas et al. | ............. | 370/334 |

FOREIGN PATENT DOCUMENTS

| JP | 08-097680 A | 4/1996 |
|---|---|---|
| JP | 2001-094496 A | 4/2001 |

* cited by examiner

*Primary Examiner*—Paulos M Natnael
(74) *Attorney, Agent, or Firm*—Crowell & Moring LLP (57) ABSTRACT

If a channel determined by a new all-directional omni-directional scanning process is absent in a channel information table created previously, a TV broadcast receiver registers a channel number (by making register flag on) and a best receiving direction of such channel in the table. If such channel is present along with a best receiving direction in the table, the receiver renews (overwrites) the best receiving direction present in the table by a best receiving direction acquired by the new scanning process. Channels already registered in the table and determined by the new scanning process as nonselectable are not deleted and are retained in the table. Thus, the receiver prevents those channels previously determined as selectable from being handled as non-selectable by the new scanning process, and a user can select maximum channels normally viewable at each receiving location.

3 Claims, 4 Drawing Sheets

CHANNEL INFORMATION TABLE

| CHANNEL NUMBER | REGISTER FLAG | BEST RECEIVING DIRECTION |
|---|---|---|
| 2 | ○ | D05 |
| 3 | | |
| 4 | ○ | D11 |
| 5 | | |
| 6 | ○ | D03 |
| ⋮ | ⋮ | ⋮ |
| 69 | ○ | D08 |

CHANNEL INFORMATION TABLE

| CHANNEL NUMBER | REGISTER FLAG | BEST RECEIVING DIRECTION |
|---|---|---|
| 2 | ○ | D06 |
| 3 | | |
| 4 | ○ | D11 |
| 5 | ○ | D14 |
| 6 | ○ | D03 |
| ⋮ | ⋮ | ⋮ |
| 69 | ○ | D08 |

| CHANNEL NUMBER | SELECTABLE/ NON-SELECTABLE | ACTIVE RECEIVING DIRECTION |
|---|---|---|
| 2 | SELECTABLE | D06 |
| 3 | NON-SELECTABLE | |
| 4 | NON-SELECTABLE | |
| 5 | SELECTABLE | D14 |
| 6 | SELECTABLE | D03 |
| ⋮ | ⋮ | ⋮ |
| 69 | NON-SELECTABLE | |

TELEVISION BROADCAST RECEIVER

BACKGROUND OF THE INVENTION

1. Field of the Invention

The present invention relates to a television broadcast receiver, and more particularly to a television broadcast receiver capable of receiving radio waves broadcast from broadcast stations located in many different directions.

2. Description of the Related Art

A television broadcast receiver connected to a multi-directional antenna having multiple receiving directions is known to be able to change an active receiving direction so as to receive television broadcasts from broadcast stations (transmission towers) in many directions. Such television broadcast receiver can receive television broadcasts even in an environment that many broadcast stations (transmission towers) spread around the television broadcast receiver or receiving location as in the North American Continent.

For using the television broadcast receiver, a channel registration as will be described below is made before the initial viewing after the television broadcast receiver is purchased. Normally, maximum channels (receiving frequencies) receivable or selectable at each receiving location are stored in advance in the television broadcast receiver. Thus, in the mode of channel registration, the television broadcast receiver sequentially changes the channels automatically, and further changes, for each channel, an active receiving direction of the multi-directional antenna connected to the television broadcast receiver.

Based on comparison of signal intensities received by the antenna for each channel, for example, the television broadcast receiver determines a best receiving direction of the antenna for the each channel to enable best receiving condition among the multiple receiving directions, and registers (stores) the best receiving direction in a channel information table by associating the best receiving direction with the each channel. In the present specification, this function of the television broadcast receiver is referred to as all-channel omni-directional scanning function, in which the term "all-channel" indicates that all the channels are sequentially changed to make analysis about each channel, and the term "omni-directional" indicates that active receiving direction each for the respective channels are sequentially changed to make analysis about each receiving direction in the each channel.

When a user selects a channel to view, the television broadcast receiver references a channel information table created at the time of the channel registration as described above, and makes active the best receiving direction registered in the channel information table for the channel selected by the user, thereby obtaining best receiving condition. In this way, the channel registration is normally sufficient for television viewing in good receiving condition. However, the mere channel registration sometimes is not sufficient, considering that after the channel registration, broadcast wave conditions may vary from those at the time of the channel registration as will be described below.

An important factor to be considered is time zone dependency. Depending on time zones of television broadcasts, intensities of radio waves of television broadcast signals (terrestrial waves) may vary. In some time zones, broadcasts may even be interrupted. Accordingly, channels receivable or selectable by even a stationary home television broadcast receiver may vary depending on time zones. For example, if a channel registration happens to be made in a midnight time zone for a channel of a broadcast station which broadcasts in daytime, not at midnight, the channel of the broadcast station cannot be registered in a channel information table even though the broadcast itself from the broadcast station exists. This causes a trouble that the channel of the broadcast station cannot be selected by normal channel selection on the basis of the channel information table.

In order to avoid this trouble, it can be considered to make a channel registration in the afternoon of a day which is generally not a broadcast interruption time zone. However, if the television broadcast receiver is located in e.g. a mountainous area where intensities of radio waves of television broadcast signals (terrestrial waves) are likely to be low, and if the channel registration is made for a channel of a broadcast station in a time zone when the intensity of the radio wave of the channel of the broadcast station happens to be low, the channel of the broadcast station still cannot be registered in the channel information table.

The following is a typical example of a consequence of such trouble. Assume for example that three broadcast stations A, B and C are positioned around a receiving location at which a television broadcast receiver is positioned. Further assume that an initial channel registration is made in a time zone at which received television broadcast signals of the two channels of broadcast stations A and B show effective or sufficiently high signal intensities so that the two channels are registered in the channel information table, whereas a received television broadcast signal of the channel of broadcast station C shows too low signal intensity to allow the channel to be registered in the channel information table. Still further assume that a user wishing to view television broadcast of the channel of broadcast station C commands a subsequent channel registration in a different time zone after the initial channel registration.

A conventional television broadcast receiver, when used to make the channel registrations as described above, creates a new channel information table, each time the television broadcast receiver creates a channel information table for a channel registration. Accordingly, if the signal intensity of the channel of broadcast station A happens to be too low at the subsequent channel registration, the channel of broadcast station A is not registered (stored) in the channel information table, which thus lacks the channel of broadcast station A, although the channels of broadcast stations B and C are registered in the channel information table.

In order to avoid the trouble as described above, it can be considered to partially retain data in a channel information table or tables created previously or in the past. More specifically, it is possible not to completely delete data in each channel information table created in each previous channel information registration at the time of creating a new channel registration. For example, it is possible to allow each new channel information table to retain, and thereby use, data (data of best receiving direction) for each channel once registered as a receivable or selectable channel in each channel information table created previously or in the past. However, this causes a problem described below.

In television broadcasts, not only the intensity of a radio wave or signal intensity varies depending on time zones, but also the direction from which the radio wave comes may vary with time. For example, a building which is being built around the television broadcast receiver, i.e. receiving location, may influence to change a best receiving direction. In this case, it is apparent that better receiving condition can be obtained in a best receiving direction determined by a newest channel registration than in a best receiving direction determined by a previous or past channel registration. This leads to a problem that the above-described conventional method of simply or merely using previous or past data (data of best receiving direction), as is, for a channel determined to be a selectable channel cannot fully utilize the omni-directional function performed at the time of channel registration, preventing a user from viewing television broadcast of such channel in best receiving condition.

Another example of antenna technology is used in a television broadcast receiver mounted on an automobile for the purpose of enabling good receiving condition in an environment where broadcast wave conditions vary. Since an automobile and hence receiving location moves, receivable broadcast stations change as it moves. Japanese Laid-open Patent Publication Hei 8-97680 discloses a television broadcast receiver to enable secure setting of such changing broadcast stations. The television broadcast receiver of this Patent Publication stores therein an information table in advance about information of receivable broadcast stations based on latitudinal and longitudinal positions of the broadcast stations. The television broadcast receiver obtains data of current position of the automobile from a GPS (Global Positioning System) receiver mounted on the automobile, and references the information table with the data of current position so as to acquire data of receivable broadcast stations at the current position. Based on the data of the receivable broadcast stations, the television broadcast receiver performs an all-channel scanning function so as to make it possible to set all receivable channels at the current position without a miss. However, this technology does not detect receiving condition in each receiving direction so as to control reception of a television broadcast signal according to the receiving condition.

SUMMARY OF THE INVENTION

An object of the present invention is to provide a television broadcast receiver capable of receiving broadcast waves coming from many directions at each receiving location, in which a channel previously selectable is prevented from becoming non-selectable by a new channel registration even if conditions of the broadcast waves vary depending on when the channel registrations are made, and in which a best receiving direction of the channel previously selectable can be renewed as a best receiving direction of the channel as determined by the new channel registration, whereby a user can select maximum channels normally viewable at the each receiving location, and can view broadcast of all selectable channels each in best receiving condition at the time of each new channel registration.

According to a first aspect of the present invention, the object is achieved by a television broadcast receiver connected to a multi-directional antenna having multiple receiving directions, comprising: a channel change unit for sequentially changing and setting channels received by the multi-directional antenna at the time of a channel registration; a receiving direction change unit for sequentially changing and setting receiving directions of the multi-directional antenna for each of the channels changed by the channel change unit; a channel information determination unit for determining, on the basis of receiving conditions of a television broadcast signal of each channel in respective receiving directions changed by the receiving direction change unit, whether or nor the each channel is a selectable channel, and for determining a receiving direction for the each channel to give good receiving condition; and a channel information table creation and storage unit (hereafter referred to simply as "storage unit") for creating and storing a channel information table containing a channel number of each selectable channel determined by the channel information determination unit and further containing a receiving condition for the each selectable channel to give good receiving condition.

Therein, if a channel number of any channel determined by the channel information determination unit to be selectable is absent in a channel information table created previously, the storage unit adds, to the channel information table, such channel number and a receiving direction to give good receiving condition for such channel, while if a channel number of any channel determined by the channel information determination unit to be selectable is present along with a receiving direction to give good receiving condition for such selectable channel in the channel information table created previously, the storage units overwrites the receiving direction present in the channel information table by a receiving direction newly determined by the channel information determination unit to give good receiving condition for such channel.

Preferably, the channel information determination unit determines selectable channels on the basis of criteria whether or not the number of sub-channels contained in broadcast data in the television broadcast signal is equal to or smaller than a predetermined number.

According to a second aspect of the present invention, the above described object is achieved by a television broadcast receiver connected to a multi-directional antenna having multiple receiving directions, comprising: a channel change unit for sequentially changing and setting channels received by the multi-directional antenna at the time of a channel registration; a receiving direction change unit for sequentially changing and setting receiving directions of the multi-directional antenna for each of the channels changed by the channel change unit; a channel information determination unit for determining, on the basis of receiving conditions of a television broadcast signal of each channel in respective receiving directions changed by the receiving direction change unit, whether or nor the each channel is a selectable channel, and for determining a receiving direction for the each channel to give good receiving condition; and a channel information table creation and storage unit (hereafter referred to simply as "storage unit") for creating and storing a channel information table containing a channel number of each selectable channel determined by the channel information determination unit and further containing a receiving condition for the each selectable channel to give good receiving condition.

Therein, the channel information determination unit comprises: a selectable channel detection unit for determining whether or not each channel is a selectable channel, on the basis of criteria whether or not intensity of the received television broadcast signal is equal to or higher than a predetermined intensity, and further on the basis of criteria whether or not the number of sub-channels contained in broadcast data in the received television broadcast signal is equal to or smaller than a predetermined number; and a best receiving direction determining unit for determining a receiving direction to give good receiving condition for each channel (such receiving direction being hereafter referred to as "best receiving direction") on the basis of comparison of intensities of the received television broadcast signal for the each channel in the multiple receiving directions, wherein if a channel number of any channel determined by the selectable channel detection unit to be selectable is absent in a channel information table created previously, the storage unit adds, to the channel information table, such channel number and a best receiving direction for such channel, while if a channel number of any channel determined by the selectable channel detection unit to be selectable is present along with a best receiving direction for such selectable channel in the channel information table created previously, the storage units overwrites the best receiving direction present in the channel information table by a best receiving direction newly determined by the selectable channel detection unit for such channel.

The television broadcast receiver according to the present invention enables that a channel selectable in the past is prevented from becoming non-selectable by a newly made channel registration even if conditions of the broadcast waves vary depending on when the channel registrations are made, and that a best receiving direction of the channel selectable in the past can be renewed as a best receiving direction of the channel as determined by the newly made channel registration. Thus, a user can select maximum channels normally viewable at each receiving location, and can view broadcast of all selectable channels each in best receiving condition at the time of each new channel registration.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 4A is a view showing a channel information table created by a previous (past) all-channel omni-directional scanning process, while

DESCRIPTION OF THE PREFERRED EMBODIMENTS

The best modes and preferred embodiments of the present invention will be described hereinafter with reference to the annexed drawings. Note that the specific embodiments described are not intended to cover the entire scope of the present invention, and hence the present invention is not limited to only the specific embodiments. Also note that like parts are designated by like reference numerals throughout the drawings.

Figure 1:
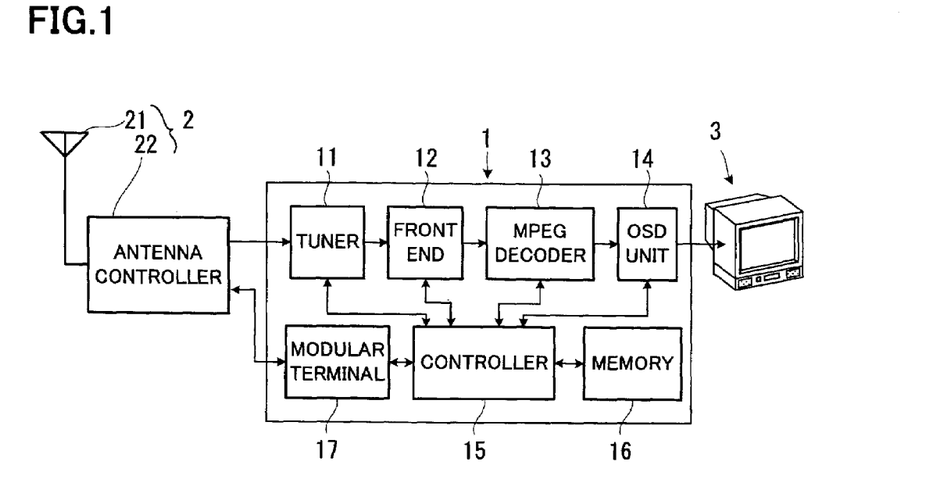
FIG. 1 is a schematic block diagram showing a TV broadcast receiver according to an embodiment of the present invention.

FIG. 1 is a schematic block diagram showing a television (TV) broadcast receiver 1 according to an embodiment of the present invention. Referring to FIG. 1, the TV broadcast receiver 1 is connected to a multi-directional antenna 2, and receives, via the multi-directional antenna 2, a digital television broadcast signal (hereafter referred to simply as "TV broadcast signal") transmitted in a given frequency band using a terrestrial transmission system. The TV broadcast receiver 1 extracts video and audio of a TV program contained in a TV broadcast signal of each channel, and outputs them to a monitor 3. Note that in the description of the present embodiment, a physical channel that is a frequency band of carrier wave used for broadcast of a TV program is referred to simply as "channel". The multi-directional antenna 2 comprises an antenna unit 21 and an antenna controller 22 which changes an active receiving direction of the antenna unit 21. The antenna controller 22 is connected via a modular terminal 17 to a later described controller 15, and is controlled by control signals from the controller 15.

The TV broadcast receiver 1 comprises: a tuner 11 connected to the antenna controller 22 for receiving each TV broadcast signal; a front end 12 for subjecting the TV broadcast signal received by the tuner 11 to predetermined signal processing so as to decode the received TV broadcast signal; an MPEG (Motion Picture Experts Group) decoder 13 for decoding the TV broadcast signal which is an MPEG-compressed signal; an on-screen display (OSD) unit 14 for superimposing a signal of a predetermined display image on the decoded TV broadcast signal to produce a combined signal and outputting the combined signal to the monitor 3; a controller 15 for controlling the entire TV broadcast receiver 1; a memory 16 for storing various information including a channel information table described in detail later so as to serve as a channel information table storage unit; and so on.

The controller 15 outputs a control signal to the tuner 11 so as to control the tuner 11 to detect and receive a TV broadcast signal of a channel selected by a user, and also to measure the intensity of each received TV broadcast signal. Under the control of the controller 15, the front end 12 subjects a TV broadcast signal of the channel detected and received by the tuner 11 to error correction and so on so as to analyze whether or not the TV broadcast signal has been received normally, and further separates a video stream containing necessary TS (Transport Stream) packets from a multiplexed signal, and further supplies necessary TS packets to respective blocks and units in the TV broadcast receiver 1. The MPEG decoder 13 decodes the video stream separated by the front end 12 into a video signal, and outputs the thus obtained video signal to the monitor 3 via the OSD unit 14. Note here that as will be described later, the controller 15 performs an all-channel omni-directional scanning process or function, whereby the controller 15 serves as a "channel change unit", a "receiving direction change unit", a "channel information determination unit", a "channel information table creation and storage unit", a "selectable channel detection unit" and a "best receiving direction determination unit" each as claimed.

Figure 2:
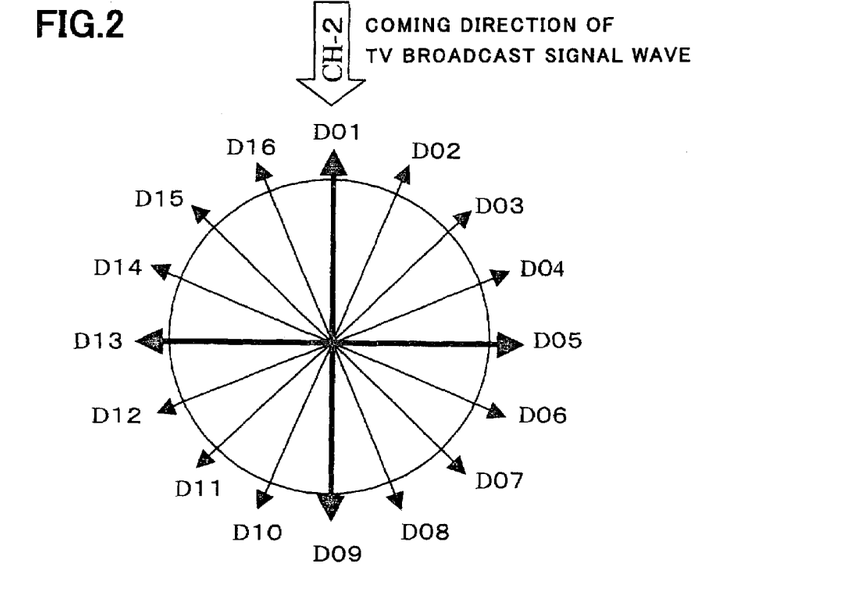
FIG. 2 is a chart showing and explaining multiple receiving directions of the multi-directional antenna together with an example of a coming direction of a TV broadcast signal wave.

FIG. 2 is a chart showing and explaining multiple receiving directions of the multi-directional antenna 2 together with an example of a coming direction of a TV broadcast signal wave. When connected to the multi-directional antenna 2, the TV broadcast receiver 1 according to the present embodiment receives, and measures receiving conditions of, TV broadcast signals coming from sixteen receiving directions provided in the EIA-909 standard as indicated by D01 to D16 in FIG. 2, respectively. The antenna controller 22 is used to mechanically or electronically change or switch the receiving direction of the multi-directional antenna 2 by making one of the multiple receiving directions active.

For example, if a broadcast wave of Channel 2 comes from a direction indicated by arrow "CH-2" shown in FIG. 2, the broadcast wave of the Channel 2 can be best received by making active the receiving direction DO 1 of the multi-directional antenna 2. More specifically, a signal intensity of a broadcast signal received by the multi-directional antenna 2 in the receiving direction D01 gives a maximum value at this time. That is, a signal intensity received by the multi-directional antenna 2 in one of the other receiving directions D02 to D16 gives a lower value than that in the receiving direction D01, and thus does not give good receiving condition, causing a worse video image to be displayed on the monitor 3 than in the receiving direction D01 as an active receiving direction.

Figure 4A:
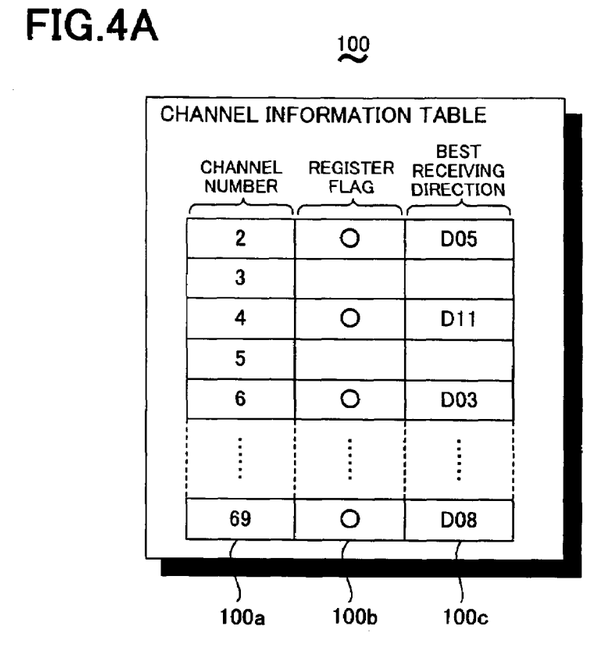

Referring now to FIG. 4A, a channel information table 100 to be stored in the memory will be described. The channel information table 100 contains channel numbers of respective channels in a channel number column 100a; registered channels (register flag) in a registered channel information column 100b indicating, in association with each channel number 100a, whether or not each channel is registered as a selectable channel; and best receiving directions of the multi-directional antenna 2 in a best receiving direction column 100c as determined by performing an all-channel omni-directional scanning process as will be described later.

Note that in the channel information table 100 of FIG. 4A, the state of a channel registered therein as a selectable channel, which can also be referred to as on-state of register flag, is indicated by a circle "○", while the state of a channel registered therein as an non-selectable channel, which can also be referred to as off-state of register flag, is indicated by blank space. Whether to make each register flag for each channel on or off, namely whether to register each channel as selectable or non-selectable, is also determined by performing the all-channel omni-directional scanning process. When a channel is selected by a user, the controller 15 reads out the channel information table 100 from the memory 16, and references the registered channels in the registered channel information column 100b so as to perform a channel selection operation if the channel is registered therein as a selectable channel.

Figure 3:
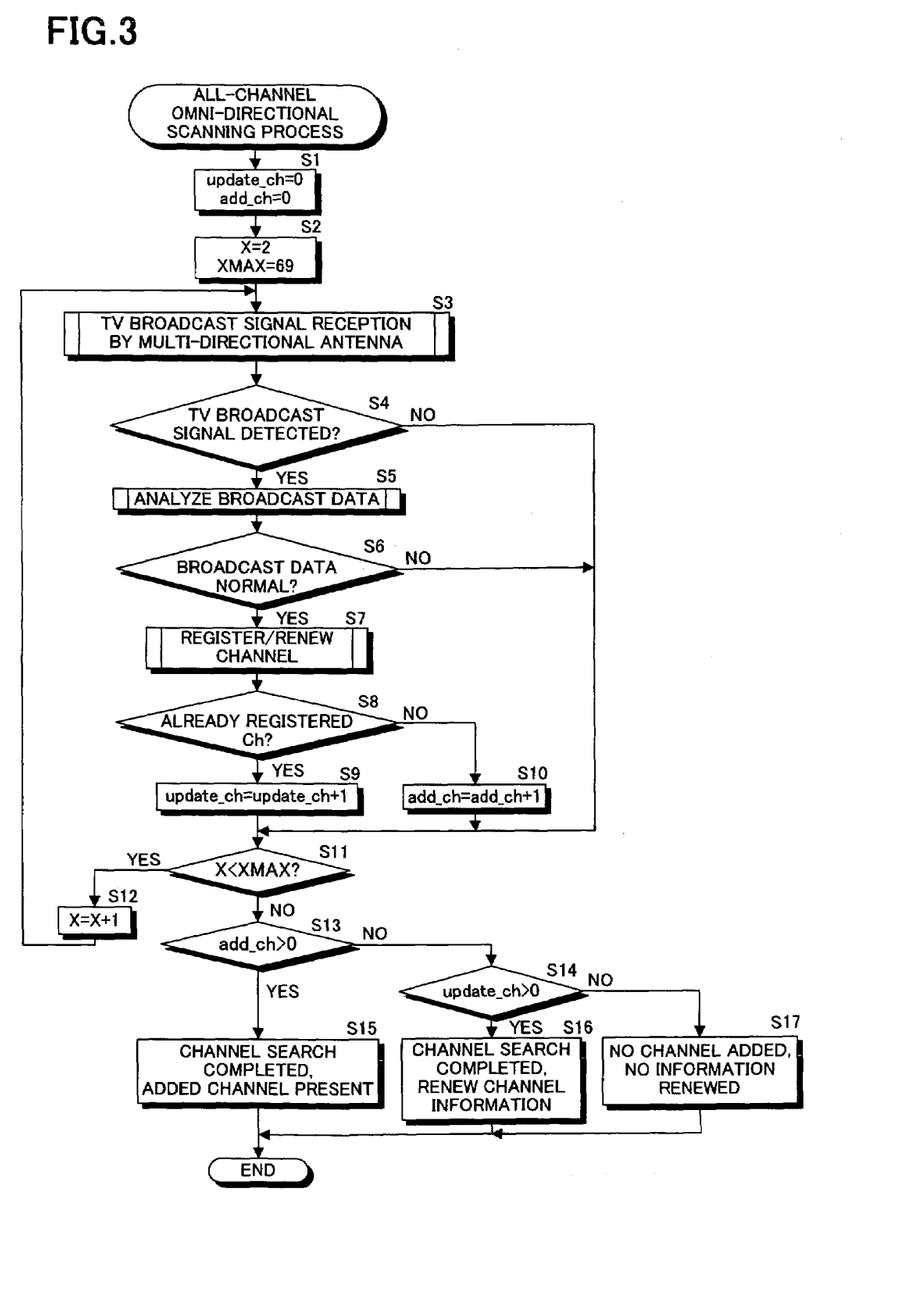
FIG. 3 is a flow chart showing an all-channel omni-directional scanning process performed by the TV broadcast receiver.

Referring now to the flow chart of FIG. 3, the following describes an all-channel omni-directional scanning process performed by the TV broadcast receiver 1 for scanning all channels to detect selectable channels and for scanning all receiving directions to detect a best receiving direction for each selectable channel so as to renew contents of a channel information table 100. When a user commands channel registration to the controller 15, the controller 15 first sets, at zero "0", an initial value of each of an update channel counter (update_ch) and an addition counter (add_ch) that are used for display after a scanning process (S1). Next, the controller 15 sets an initial value of Channel X (channel counter) and an end value of Channel Xnax at "2" and "69", respectively, to start and end the all-channel omni-directional scanning process, respectively (S2).

The controller 15 controls the tuner 11 to be prepared for receiving Channel X, and then sends a control signal to the antenna controller 22 to sequentially make the sixteen (16) receiving directions of the multi-directional antenna 2 active one after another, so as to receive a television broadcast signal of Channel X in each receiving direction (S3). More specifically, according to the present embodiment, the active receiving direction of the multi-directional antenna 2 is changed or switched sequentially from D01 to D16 so that the controller 15 controls the tuner 11 to measure a signal intensity of the television broadcast signal in each of the receiving directions. If the tuner 11 cannot detect a television broadcast signal in any one of the receiving directions (NO in S4), the controller 11 determines whether or not Channel Xmax is unreached by Channel X (S11). If unreached (YES in S11), the controller 15 adds "1" to Channel X (S12), going back to the step S3 again.

If the tuner 11 detects a television broadcast signal in one or some of the receiving directions (i.e. if intensity of the received signal in each of such receiving directions is equal to or higher than a predetermined threshold value) (YES in S4), the controller 11 determines a best receiving direction (receiving direction to give best receiving condition) from such receiving directions on the basis of first criteria described below, and further analyzes broadcast data in the thus received television broadcast signal on the basis of second criteria described below so as to determine whether or not the broadcast data is normal (S5). Firstly, the controller 15 temporarily stores, in the memory 16, respective intensities of television broadcast signals received in the respective sixteen receiving directions sequentially changed, and compares these received intensities so as to take one receiving direction giving the highest signal intensity as a best receiving direction among the sixteen receiving directions.

Secondly, the controller 15 extracts information about the number of sub-channels contained in, and from, the received broadcast data, and determines whether or not the number of sub-channels is equal to or smaller than "99". If the number of sub-channels is equal to smaller than "99", the controller 15 determines the broadcast data to be normal. If it is larger than "99", the controller 15 determines the broadcast data not to be normal. As further criteria to determine the normality or non-normality of the broadcast data, the decodability of the broadcast signal can be used, such as to determine the broadcast data not to be normal if audio data and video data contained in the broadcast data cannot be decoded normally (e.g. because they do not meet standard). There are other criteria or methods which can be used for determining or analyzing the normality of the broadcast data in the step S5, but their description is omitted here.

If the analysis in the step S5 indicates that the broadcast data of the broadcast signal of Channel X under analysis is not normal (NO in S6), the controller 15 determines whether or not Channel Xmax is unreached by Channel X (S11). If unreached (YES in S11), the controller 15 adds "1" to Channel X (S12), going back to the step S3 again. In other words, even if the intensity of the received television broadcast signal of Channel X is equal to or higher than the threshold value, Channel X is determined to be a non-selectable channel as it is non-normal or merely a test broadcast, and is thus not registered in the channel information table 100.

On the other hand, if the analysis in the step S5 indicates that the broadcast data of the broadcast signal of Channel X under analysis is normal (YES in S6), the controller 15 determines Channel X to be a selectable channel, and add and register Channel X in the channel information table 100 (i.e. additional registration mode), or renew the channel information table 100 by Channel X (i.e. renew mode) (S7). The additional registration in or renewal of the channel information table 100 differs depending on whether Channel X is already registered (stored) as a selectable channel in a channel information table 100 created previously or in the past. More specifically, if Channel X does not exist or is absent (as a selectable channel) in a channel information table 100 created previously, Channel X with its associated data is added to and registered (i.e. additional registration mode) in the channel information table 100. On the other hand, if Channel X already exists or is present (as a selectable channel) in a channel information table 100 created previously, data of best receiving direction for Channel X in a best receiving direction column 100c of the channel information table 100 is rewritten to (overwritten by) a new best receiving direction as obtained by a new omni-directional scanning process performed for Channel X (i.e. renewal mode). This will be described in detail below with reference to FIG. 4A and FIG. 4B.

Figure 4B:
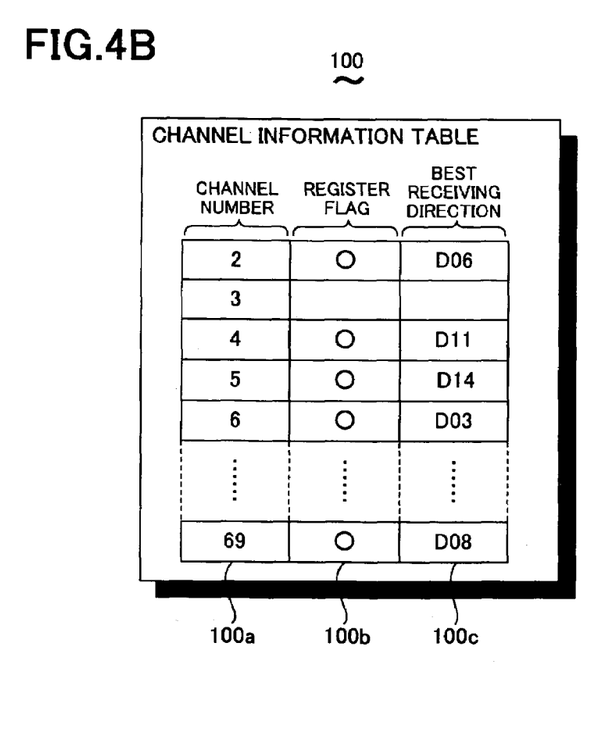
FIG. 4B is a view showing a channel information table renewed by a new all-channel omni-directional scanning process.
Figure 5:
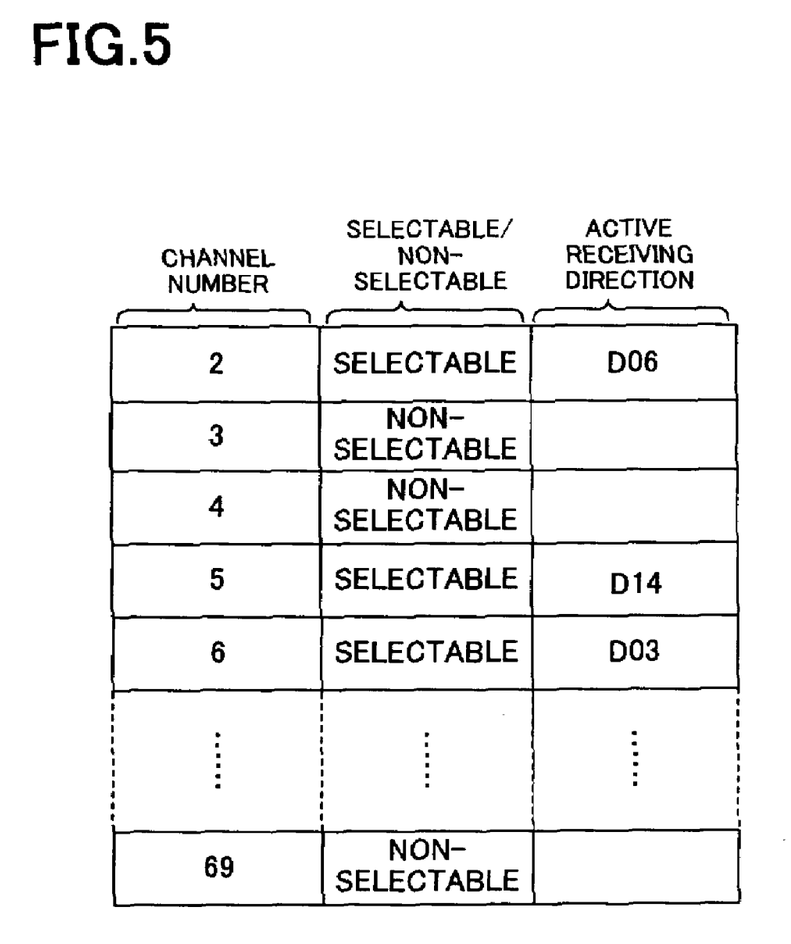
FIG. 5 is a view showing information in a tabular form as acquired at the time of the new all-channel omni-directional scanning process.

Now assume that the channel information table 100 shown in FIG. 4A is one created in a previous (immediately preceding) channel registration (such table being thus referred to hereafter as "base channel information table"), and that channel information acquired by performing a new all-channel omni-directional scanning process has contents as shown in FIG. 5. Regarding Channel 2, FIG. 5 indicates that Channel 2 is determined by the new omni-directional scanning process as a selectable channel with a best receiving direction being D06. Referring to the base channel information table 100, Channel 2 is already registered therein as a selectable channel (register flag being on). Accordingly, the data of best receiving direction for Channel 2 in the best receiving direction column 100c of the base channel information table 100, that is "D05", is rewritten to or overwritten by "D06" (i.e. renewal mode). FIG. 4B shows a channel information table 100 after rewritten or renewed (such renewed table being thus referred to hereafter as "new channel information table").

Regarding Channel 3 and Channel 4, FIG. 5 indicates that Channel 3 and Channel 4 are determined by the new omni-directional scanning process as non-selectable channels. Thus, the data in the base channel information table 100 of FIG. 4A for Channel 3 and Channel 4 are retained, as is, to be contained in (or transferred to) the new channel information table 100 FIG. 4B (i.e. retention mode), as apparent from the comparison between FIG. 4A and FIG. 4B. Regarding Channel 5, FIG. 5 indicates that Channel 5 is determined by the new omni-directional scanning process as a selectable channel with a best receiving direction being D14. Referring to the base channel information table 100, Channel 5 does not exist or is absent therein as a selectable channel. Accordingly, the data of selectable channel (register flag being on) for Channel 5 is added to the registered channel information column 100b, and the data of best receiving direction for Channel 5, that is "D14", is added to the best receiving direction column 100c so as to register these data for Channel 5 in the base channel information table 100 thus to be contained in (or transferred to) the new channel information table 100 as shown in FIG. 4B (i.e. additional registration mode).

Similarly, regarding Channel 6, FIG. 5 indicates that Channel 6 is determined by the new omni-directional scanning process as a selectable channel with a best receiving direction being D03. Referring to the base channel information table 100, Channel 6 is already registered therein as a selectable channel (register flag being on). Accordingly, the data of best receiving direction for Channel 6 in the best receiving direction column 100c of the base channel information table 100, that is "D03", is rewritten to or overwritten by "D03" to be contained in (or transferred to) the new channel information table 100 as shown in FIG. 4B (i.e. renewal mode). (Note here that it does not appear on the surface that there is a rewriting between these data although there is, because these data are the same.) Lastly, regarding Channel 69, FIG. 5 indicates that Channel 69 is determined by the new omni-directional scanning process as a non-selectable channel. Thus, the data in the base channel information table 100 of FIG. 4A for Channel 69 is retained, as is, to be contained in the new channel information table 100 of FIG. 4B (i.e. retention mode), as apparent from the comparison between FIG. 4A and FIG. 4B.

The example described above with reference to FIGS. 4A, 4B and 5 can be summarized as follows. Channels 4 and 69 are determined as selectable channels in the previous or past channel registration or registrations, but are determined as non-selectable channels at the time of the new channel registration. Thus, the data of Channels 4 and 69 are not deleted from the base channel information table 100, but are retained, as is, to be contained in the new channel information table 100 (i.e. retention mode in which the register flag is not turned off, and the data of the best receiving direction is retained). In contrast, Channel 5 is not registered in the base channel information table 100, but is determined as selectable at the time of the new channel registration. Thus, the data of Channel 5 is added to the base channel information table 100 so as to be registered in the new channel information table 100 (i.e. additional registration mode). On the other hand, Channels 2 and 6, which are determined as selectable channels at the time of the new channel registration, are already registered in the base channel information table 100 (register flag being on). Accordingly, the data of the best receiving direction in the best receiving direction column 100c in the base, channel information table I 00 is overwritten by the newly acquired data of the best receiving direction for each of Channels 2 and 6 so as to be contained as new data in the new channel information table 100 (i.e. renewal mode).

The above description indicates that, for each channel determined to be a selectable channel in the step S6, the television broadcast receiver 1 uses the different modes of storing newly acquired data in the new channel information table 100 (additional registration mode or renewal mode) depending on whether the each channel exists or is present in the base channel information table 100, while for each channel determined to be a non-selectable channel in the step S6, the television broadcast receiver 1 adopts the mode of allowing data, if any, registered in the past channel information table 100 to be retained therein so as to be contained in the new channel information table 100 (retention mode). The above described update channel counter (update_ch) and addition counter (add_ch) are used and renewed in a manner described below to provide base data to notify a user of these modes (additional registration, renewal and retention) for the user to easily recognize the different modes.

Referring back to the flow chart of FIG. 3 (S8), if a channel (or channels) determined to be a selectable channel exists or is present in the base channel information table 100 (such as Channels 2 and 6 in the above described example), each such channel is an already registered channel (YES in S8), so that the controller 15 adds one "1" to the update channel counter (S9). On the other hand, if a channel (or channels) determined to be a selectable channel does not exist or is absent in the base channel information table 100 (such as Channel 5 in the above described example), such channel is not an already registered channel (NO in S8), so that the controller 15 adds one "1" to the addition counter (S10). Then, the controller 15 determines whether or not Channel Xmax is unreached by Channel X (S11). If unreached (YES in S11), the controller 15 adds one "1" to Channel X (S12), going back to the step S3. On the other hand, if not unreached (NO in S1) (namely if reached), the controller 15 controls the OSD unit 14 to display a message on the monitor 3 in a manner described below.

If the value of the addition counter is larger than zero "0" after the all-channel omni-directional scanning process is completed for all the channels (Channel 2 to Channel 69) (YES in S13), the controller 15 controls the OSD unit 14 to display a message on the monitor 3, indicating the presence of an added channel(s) by saying e.g. "The channel search is completed, and there is an added channel(s)." (S15). Further, if the value of the addition counter is zero "0" (NO in S13), and if the value of the update channel counter is larger than zero "0" (YES in S14), the controller 15 controls the OSD unit 14 to display a message on the monitor 3, indicating that a best receiving direction for at least one of the channels has been changed by saying e.g. "The channel search is completed, and there is channel information renewal." (S16).

On the other hand, if the value of the addition counter is zero "0" (NO in S13), and if the value of the update channel counter is also zero "0" (NO in S14), the controller 15 controls the OSD unit 14 to display a message on the monitor 3, indicating that there is no change neither in the number of selectable channels, nor in the best receiving direction of any one of the channels by saying e.g. "There is no channel addition, and no information renewal." (S17). By such messages displayed on the monitor 3, the user can recognize the outline of the result of the newly made channel registration (i.e. newly performed all-channel omni-directional scanning process).

In the manner described above, the all-channel omni-directional scanning process is performed, and the base channel information table 100 shown in FIG. 4A is renewed to the new channel information table 100 shown in FIG. 4B. Summarizing, in the base channel information table 100 created at the time of the previous channel registration, Channels 2, 4, 6 and 69 are registered as selectable channels (register flag of each channel being on) with a best receiving direction for each channel being also registered therein. At the time of the new channel registration by the new all-channel omni-directional scanning process, only Channels 2, 5 and 6 are determined as selectable channels with a best receiving direction for each of these three channels being determined.

Thus, Channel 5 is determined as a selectable channel (register flag being on), and "D14" is registered as a best receiving direction, since Channel 5 is absent in the base channel information table 100. Further, since Channels 2 and 6 are already registered as selectable channels in the base channel information table 100, the best receiving direction of each such channel registered therein is overwritten by a best receiving direction of each such channel as newly acquired. Furthermore, since Channels 3, 4 and 69 are determined as non-selectable channels at the new channel registration, the data of these three channels registered in the base channel information table 100 are not changed, and are retained as is. Accordingly, Channels 4 and 69 which are non-selectable at the time of the new or newest channel registration are retained as selectable channels in the base channel information table 100 to be contained in the new channel information table 100.

Regarding Channel 2, the best receiving direction "D06" in the new channel information table 100, which is changed from the best receiving direction "D05" registered in the base channel information table 100, is considered to give better receiving condition for viewing than "D05", since "D06" is acquired by the new or newest all-channel omni-directional scanning process. In addition, the user can recognize the presence or absence of an added channel as well as the presence or absence of renewal of channel information, by viewing a message displayed on the monitor 3 after the newly made channel registration (i.e. newly performed all-channel omni-directional scanning process).

It is to be noted that the present invention is not limited to the above embodiments, and various modifications are possible. For example, TV broadcast signals to be received by the TV broadcast receiver 1 can be not only digital television broadcast signals, but also analog television broadcast signals. Further, as output information to be displayed on the monitor 3 after the all-channel omni-directional scanning process, it is possible for the TV broadcast receiver 1 to display the number of added channels and/or channel numbers of the added channels instead of or in addition to the above described messages. Furthermore, the output information can, for example be audio output.

The present invention has been described above using presently preferred embodiments, but such description should not be interpreted as limiting the present invention. Various modifications will become obvious, evident or apparent to those ordinarily skilled in the art, who have read the description.

Accordingly, the appended claims should be interpreted to cover all modifications and alterations which fall within the spirit and scope of the present invention.

What is claimed is:

1. A television broadcast receiver connected to a multi-directional antenna having multiple receiving directions, comprising:
   a channel change unit for sequentially changing and setting channels received by the multi-directional antenna at the time of a channel registration;
   a receiving direction change unit for sequentially changing and setting receiving directions of the multi-directional antenna for each of the channels changed by the channel change unit;
   a channel information determination unit for determining, on the basis of receiving conditions of a television broadcast signal of each channel in respective receiving directions changed by the receiving direction change unit, whether or not the each channel is a selectable channel, and for determining a receiving direction for the each channel to give good receiving condition; and
   a channel information table creation and storage unit for creating and storing a channel information table containing a channel number of each selectable channel determined by the channel information determination unit and further containing a receiving condition for the each selectable channel to give good receiving condition,
   wherein if a channel number of any channel determined by the channel information determination unit to be selectable is absent in a channel information table created previously, the storage unit adds, to the channel information table, such channel number and a receiving direction to give good receiving condition for such channel, while if a channel number of any channel determined by the channel information determination unit to be selectable is present along with a receiving direction to give good receiving condition for such selectable channel in the channel information table created previously, the storage unit overwrites the receiving direction present in the channel information table by a receiving direction newly determined by the channel information determination unit to give good receiving condition for such channel,
   wherein if channels are determined as selectable channels at the time of a previous channels registration, but are determined as non-selectable channels at the time of the channels registration, data of the channels in the channel information table are retained unchanged in the channel information table.

2. The television broadcast receiver according to claim 1, wherein the channel information determination unit determines selectable channels on the basis of criteria whether or not the number of sub-channels contained in broadcast data in the television broadcast signal is equal to or smaller than a predetermined number.

3. A television broadcast receiver connected to a multi-directional antenna having multiple receiving directions, comprising:
   a channel change unit for sequentially changing and setting channels received by the multi-directional antenna at the time of a channel registration;
   a receiving direction change unit for sequentially changing and setting receiving directions of the multi-directional antenna for each of the channels changed by the channel change unit;
   a channel information determination unit for determining, on the basis of receiving conditions of a television broadcast signal of each channel in respective receiving directions changed by the receiving direction change unit, whether or not the each channel is a selectable channel, and for determining a receiving direction for the each channel to give good receiving condition; and a channel information table creation and storage unit for creating and storing a channel information table containing a channel number of each selectable channel determined by the channel information determination unit and further containing a receiving condition for the each selectable channel to give good receiving condition, wherein the channel information determination unit comprises:

a selectable channel detection unit for determining whether or not each channel is a selectable channel, on the basis of criteria whether or not intensity of the received television broadcast signal is equal to or higher than a predetermined intensity, and further on the basis of criteria whether or not the number of sub-channels contained in broadcast data in the received television broadcast signal is equal to or smaller than a predetermined number; and a best receiving direction determining unit for determining a receiving direction to give good receiving condition for each channel on the basis of comparison of intensities of the received television broadcast signal for the each channel in the multiple receiving directions, and wherein if a channel number of any channel determined by the selectable channel detection unit to be selectable is absent in a channel information table created previously, the storage unit adds, to the channel information table, such channel number and a best receiving direction for such channel, while if a channel number of any channel determined by the selectable channel detection unit to be selectable is present along with a best receiving direction for such selectable channel in the channel information table created previously, the storage unit overwrites the best receiving direction present in the channel information table by a best receiving direction newly determined by the selectable channel detection unit for such channel, wherein if channels are determined as selectable channels at the time of a previous channel registration, but are determined as non-selectable channels at the time of the channel registration, data of the channels in the channel information table are retained unchanged in the channel information table.

* * * * *